(12) United States Patent
Ling et al.

(10) Patent No.: US 7,706,092 B2
(45) Date of Patent: Apr. 27, 2010

(54) NULL SERVO PATTERN FOR BIT-PATTERNED MEDIA

(75) Inventors: Qiang Ling, Pittsburgh, PA (US); Mehmet Fatih Erden, Pittsburgh, PA (US); Alexei H. Sacks, Edina, MN (US); Sundeep Chauhan, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 287 days.

(21) Appl. No.: 11/854,013

(22) Filed: Sep. 12, 2007

(65) Prior Publication Data

US 2009/0067090 A1 Mar. 12, 2009

(51) Int. Cl.
G11B 5/09 (2006.01)
(52) U.S. Cl. .............................. 360/48; 360/29; 360/75
(58) Field of Classification Search ........................ None
See application file for complete search history.

(56) References Cited

U.S. PATENT DOCUMENTS

| 5,956,216 | A | 9/1999 | Chou ......................... 360/131 |
| 7,064,914 | B1 | 6/2006 | Erden et al. ................... 360/31 |
| 2001/0036030 | A1 | 11/2001 | Sacks et al. .................... 360/75 |
| 2003/0076612 | A1 | 4/2003 | Sacks et al. .................... 360/59 |
| 2003/0113524 | A1 | 6/2003 | Klemmer et al. ............. 428/209 |
| 2005/0157597 | A1 | 7/2005 | Sendur et al. ............. 369/13.55 |
| 2005/0271819 | A1 | 12/2005 | Wago et al. .................. 427/259 |
| 2006/0012913 | A1* | 1/2006 | Nakamura et al. ........ 360/77.02 |
| 2007/0217075 | A1* | 9/2007 | Kamata et al. .............. 360/135 |
| 2008/0002269 | A1* | 1/2008 | Sakurai et al. ................ 360/48 |
| 2008/0002295 | A1* | 1/2008 | Sakurai et al. .............. 360/131 |
| 2009/0059412 | A1* | 3/2009 | Erden et al. .................... 360/75 |

FOREIGN PATENT DOCUMENTS

WO WO 2004/010420 A1 1/2004

* cited by examiner

*Primary Examiner*—Jason C Olson
(74) *Attorney, Agent, or Firm*—Westman, Champlin & Kelly, P.A.

(57) ABSTRACT

A patterned recording media comprises a segment and a null pattern formed in the segment. The segment comprises first and second rows of discrete magnetic elements separated by a non-magnetic material, and a row of non-magnetic material positioned between the first and second rows. The null pattern comprises consecutive groups of the discrete magnetic elements in the first and second rows of the segment. Each group in the first row has a magnetic polarity that is opposite the magnetic polarity of adjoining groups in the first row. Each group in the second row has a magnetic polarity that is opposite the magnetic polarity of adjoining groups in the second row.

19 Claims, 15 Drawing Sheets

NULL SERVO PATTERN FOR BIT-PATTERNED MEDIA

FIELD OF THE INVENTION

The present invention relates to data storage devices and, more particularly, but not by limitation, to bit-patterned media and servo sector null patterns of bit-patterned media.

BACKGROUND OF THE INVENTION

The present invention relates to data storage devices and, in particular, to bit-patterned media and servo sector null patterns of bit-patterned media.

In a conventional magnetic disc drive, data is stored on one or more discs, which are coated with a thin magnetically hard layer. The magnetic layer itself is composed of a single sheet of very fine, single-domain grains. Every information bit of data is stored by many grains. This granular recording medium is typically divided into a plurality of generally parallel data tracks, which are arranged concentrically with one another perpendicular to the disc radius.

To guarantee good signal-to-noise ratio using such conventional magnetic media, the number of grains in every bit should be above a certain level. In order to save more bits on the given disc area (i.e., to increase the areal density), the size of a single grain is decreased. This is called scaling.

It is understood that scaling is limited by the onset of superparamagnetism: if the grain size is too small, the magnetic energy of grains is not sufficiently large compared to the thermal energy so that the magnetization becomes unstable and information can no longer be stored reliably. Superparamagnetism puts an areal density limit of 0.5 $Tb/in^2$ for perpendicular recording.

This areal density limit could be exceeded through the use of bit-patterned media. In a patterned medium recording, ordered arrays of discrete magnetic elements are used to store data. The magnetic elements are separated from each other by a non-magnetic material. Each of the discrete magnetic elements or islands is a single grain and stores one information bit.

Unlike the conventional magnetic media, which requires the alignment of many adjoining magnetic particles that must each be magnetized into the same polarity (either positive or negative) to define a bit of data, the adjacent magnetic elements or islands of the bit-patterned media can have the same or different magnetic polarities due to their separation from each other by the non-magnetic material. This difference should allow bit-patterned media to have a much higher areal density than the conventional magnetic recording media.

High areal density recordings using bit-patterned media will require the precise placement of the head relative to tracks of the media. Unfortunately, conventional null patterns used by servo systems for controlling the head position relative to tracks of the granular magnetic medium are incompatible with bit-patterned media.

Aspects of the present embodiments provide solutions to these and other problems, and offer other advantages over the prior art.

SUMMARY OF THE INVENTION

Patterned recording media is disclosed. The patterned recording media comprises a segment and a null pattern formed in the segment. The segment comprises first and second rows of discrete magnetic elements separated by a non-magnetic material, and a row of non-magnetic material positioned between the first and second rows. The null pattern comprises consecutive groups of the discrete magnetic elements in the first and second rows of the segment. Each group in the first row has a magnetic polarity that is opposite the magnetic polarity of adjoining groups in the first row. Each group in the second row has a magnetic polarity that is opposite the magnetic polarity of adjoining groups in the second row.

These and various other features as well as advantages which characterize the present invention will be apparent upon reading of the following detailed description and review of the associated drawings.

DETAILED DESCRIPTION OF ILLUSTRATIVE EMBODIMENTS

A description of embodiments of the invention is provided below with reference to the figures. It is understood that the present invention comprises the embodiments described herein taken alone and in combination with one or more of the other embodiments described herein. Additionally, elements that are identified by the same reference in the figures generally depict the same or similar elements including various embodiments of the elements.

Figure 1:
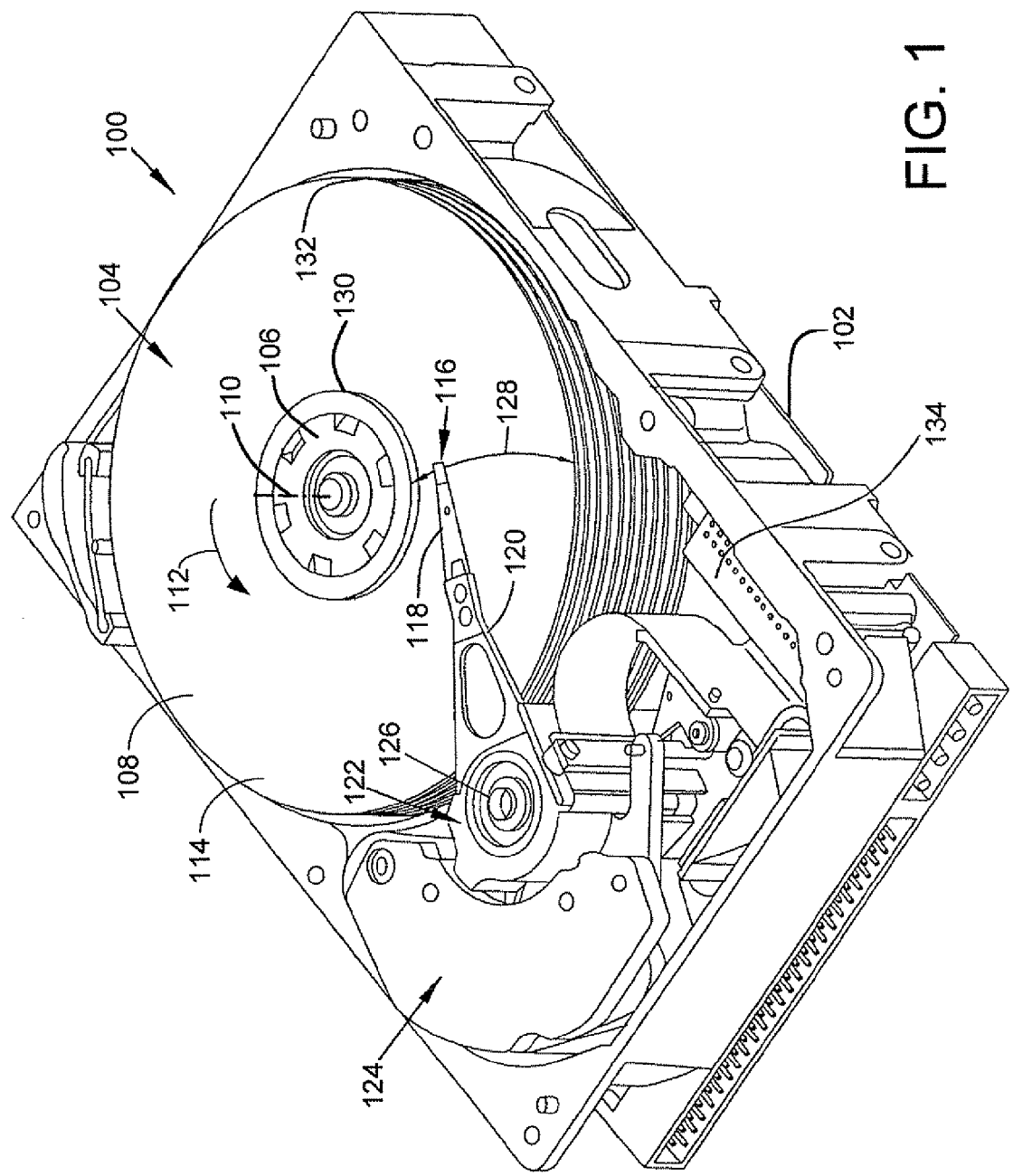
FIG. 1 is an isometric view of a disc drive.

FIG. 1 is an isometric view of a disc drive 100 in accordance with embodiments of the invention. Disc drive 100 includes a housing with a base 102 and a top cover (not shown). Disc drive 100 further includes a disc pack 104, which is mounted on a spindle motor (not shown) by a disc clamp 106. The disc pack 104 includes a plurality of individual discs 108, which are mounted for co-rotation about central (spin) axis 110 in a direction 112. In one embodiment, the discs 108 are patterned recording media having a patterned magnetic surface 114, which will be described below in greater detail Each disc 108 has an associated disc head slider 116 which is mounted to the disc drive 100 for communication with the patterned recording surface 114. In the example shown in FIG. 1, the sliders 116 are supported by suspensions 118 which are in turn attached to track accessing arms 120 of an actuator 122. The actuator shown in FIG. 1 is of the type known as a rotary moving coil actuator and includes a voice coil motor (VCM), shown generally at 124. The voice coil motor 124 rotates the actuator 122 with its attached heads 116 about a pivot shaft 126 to position the slider 116 and its corresponding read and/or write transducing heads over a desired data track of the surface 114 along an arcuate path 128 between a disc inner diameter 130 and a disc outer diameter 132. The voice coil motor 124 is driven by a servo system 134 based on signals generated by the transducing heads and an embedded controller in the disc drive.

Figure 2:
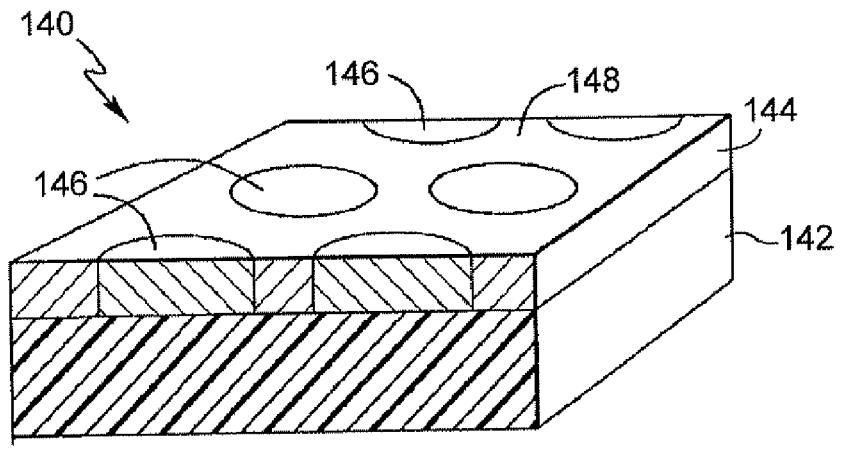
FIG. 2 is a partially schematic sectional isometric view of a patterned recording media in accordance with embodiments of the invention.
Figure 3:
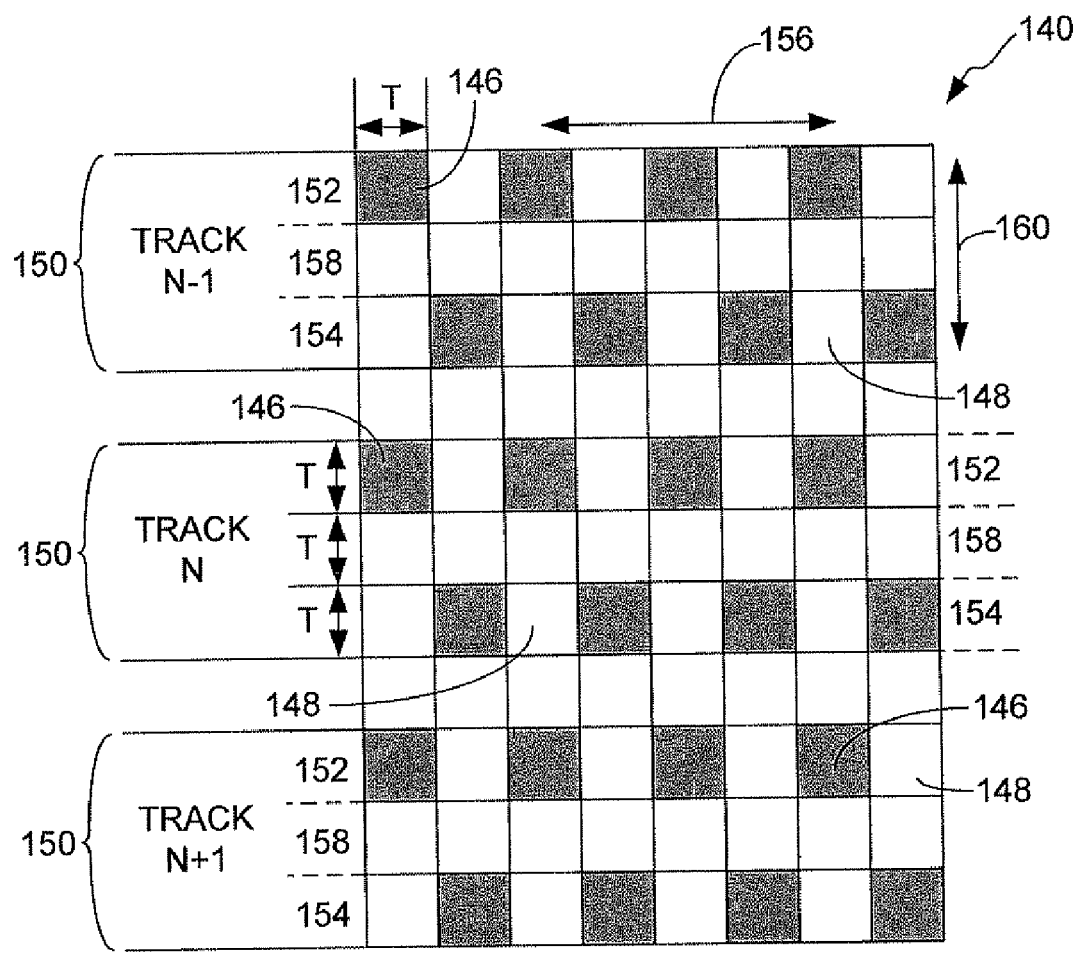
FIG. 3 is a partial top plan view of tracks of a patterned recording media in accordance with embodiments of the invention.

FIG. 2 illustrates a simplified sectional isometric view and FIG. 3 is a simplified top plan view of a portion of an exemplary patterned recording media 140 in accordance with embodiments of the invention. One embodiment of the patterned recording media 140 comprises a substrate 142 on which a patterned recording layer or film 144 is applied.

One embodiment of the patterned recording media 140 comprises an ordered array of patterned discrete magnetic elements or islands 146 in the recording layer 144 that are separated from each other by non-magnetic material 148. The discrete magnetic elements 146 are represented in FIG. 3 and subsequent figures by the shaded boxes while the non-magnetic material 148 is generally represented by the non-shaded boxes.

The discrete magnetic elements 146 can be formed using any suitable technique. The shape of the magnetic elements can be oval (FIG. 2), irregular, rectangular or any other desired shape. In the exemplary media depicted in FIG. 3, the discrete magnetic elements are square having sides of length T.

As used herein, the term "magnetic" means ferromagnetic or ferrimagnetic. The term "non-magnetic" means paramagnetic, antiferromagnetic or diamagnetic, and also includes weakly magnetic materials.

The discrete magnetic elements 146 each represent a single bit of data based on the magnetic polarity of the element. For example, a discrete magnetic element having a positive polarity can represent a logical zero while a magnetic element having a negative polarity represents a logical 1. The particular orientation and direction of the domain of the magnetic elements that represents the positive or negative polarity, can be selected as desired based on the recording technique that is used. Additionally, in accordance with one embodiment, the magnetic fields generated by the magnetic elements have substantially the same magnitude.

One embodiment of the patterned recording media 140 comprises one or more tracks or segments 150. Each of the tracks 150 comprise a first row 152 of the discrete magnetic elements 146 and a second row 154 of the discrete magnetic elements 146. The rows 152 and 154 extend in a lengthwise direction 156 along the track 150, as shown in FIG. 3. A row 158 of non-magnetic material, such as material 148, is positioned between the first and second rows 152 and 154 of the magnetic elements 146.

In one embodiment, the rows 152 and 154 of the discrete magnetic elements 146 are staggered. As used herein, the term "staggered" means that the discrete magnetic elements of the first row 152 are not aligned with the magnetic elements of the second row 154 in the cross-track or radial direction 160. The cross-track or radial direction 160 is transverse to the lengthwise direction 156.

It is understood by those skilled in the art that the portion of the media 140 illustrated in FIG. 3 and similar illustrations discussed below are greatly enlarged so that the track rows appear to be in straight lines. However, the tracks and their corresponding rows can be formed as circular tracks on a disc 108, as illustrated in FIG. 4.

Figure 4:
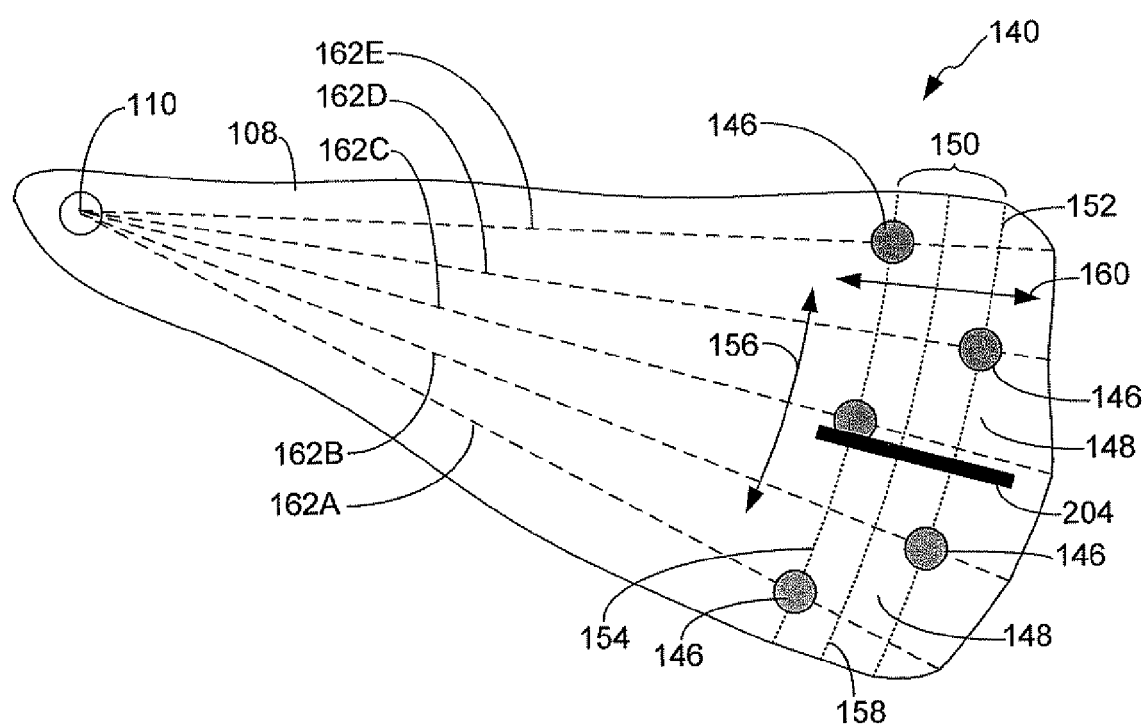
FIG. 4 is a partial top plan view of a patterned recording disc illustrating a single track in accordance with embodiments of the invention.

FIG. 4 is a partial top plan view of the patterned recording disc 108 illustrating a single track 150 comprising the first and second staggered rows 152 and 154 of the discrete magnetic elements 146. In one embodiment of the disc 108, the first and second rows 152 and 154 of the discrete magnetic elements 146 are substantially concentric to the central axis 110. In one embodiment, the radial position of the first row 152 of the discrete magnetic elements 146 is different than the radial position of the second row 154. In another embodiment, the discrete magnetic elements 146 in the first and second rows 152 and 154 of the track 150 are located at different angular positions relative to the central axis 110, as indicated by the radial lines 162A-E. As a result, the first and second rows 152 and 154 are staggered.

The areal density of bit-patterned media, such as media 140, is expected to be high, which means that the size of the discrete magnetic elements 146, designated as T, should be small. For example, the areal density of 1 terabit/in$^2$ requires T$\leq$13 nanometers. In order to correctly position the read/write head over the desired small magnetic islands 146, the servo system 134 needs to precisely measure the current head position, particularly the cross-track head position relative to the center of the track 150 or the row 158 of the non-magnetic material for the track 150.

Figure 5:
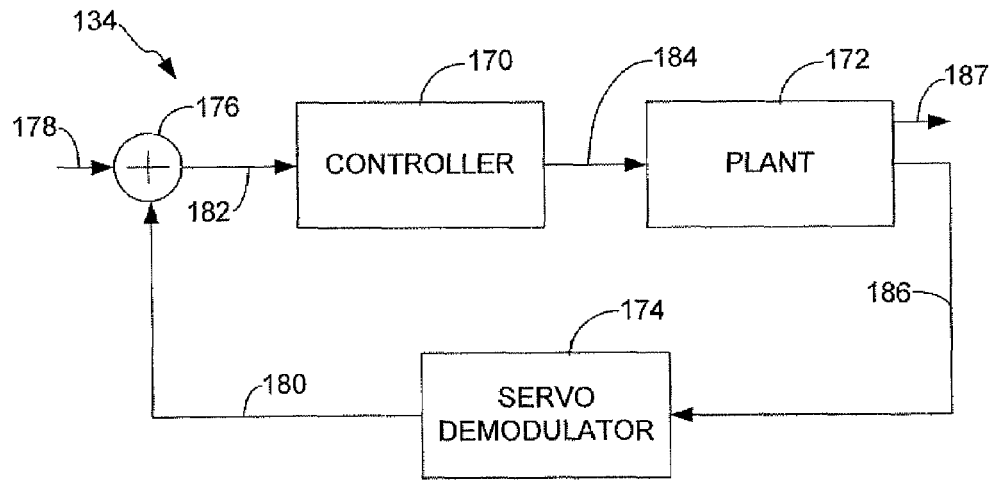
FIG. 5 is a block diagram of an exemplary servo system in accordance with embodiments of the invention.

FIG. 5 is a block diagram of an exemplary servo system 134 in accordance with embodiments of the invention. As mentioned above, the servo system 134 operates to control a position of a transducing read head, which may by carried by the slider 116 (FIG. 1), relative to one of the tracks 150 of the patterned recording media 140 using servo sector data stored in the tracks 150 of the media 140. The servo system 134 is arranged as a control loop that includes a controller 170, a plant 172, a servo demodulator 174, and a summing junction 176.

The summing junction 176 receives a reference position signal 178 and a position estimate output signal 180. The reference position signal 178 indicates a desired head position relative to the center of a track 150 that is being read by the read head. The summing junction 176 calculates the difference between the desired and estimated signals 178 and 180 to provide an error output 182 that is representative of a desired adjustment of the position of the head slider 116.

The error output 182 is provided to the controller 170, which in turn produces a control output 184 for the plant 172. The plant 172 produces a control signal 187 in response to the control output 184 that directs the actuator 122 (FIG. 1) to move the slider 116 carrying the transducing head toward the desired position indicated by the signal 178.

The plant 172 represents the magnetic (or possibly optical) recording system whose servo sector output signal 186 is a readback signal with servo specific position information. The readback signal is produced in response to the sensing of servo sector data on the recording media 140, such as the disc 108, by the transducing read head of the slider 116. As will be discussed below, embodiments of the servo sector include recorded position data for each track including one or more servo null or burst patterns that are used to generate a position error signal in the readback signal 186 that indicates a position of the head relative to a center of the current track. Accordingly, the readback signal 186 corresponding to the servo sector can be used to obtain current position data for the head slider including a current track and a location of the head relative to a center of the current track.

The readback signal 186 is provided to the servo demodulator 174, which includes circuitry that demodulates and decodes the position data to extract the position error signal and the current track position, which is provided in the position estimate output signal 180. When the desired position of the head indicated by the reference signal 178 is set to zero for track center, the difference between the position estimate signal 180 and the reference or desired position signal 178 will be the position error signal once the head is positioned over the desired track. However, the desired position of the head may be an offset value from the center of the track. As a result, once the head is positioned over the desired track, the error output 182 may consist of a difference between a desired position error signal representative of a desired position within the track and the actual or estimated position error signal produced by the servo demodulator 174 that is representative of the current position of the head relative to a center of the track.

Figure 6:
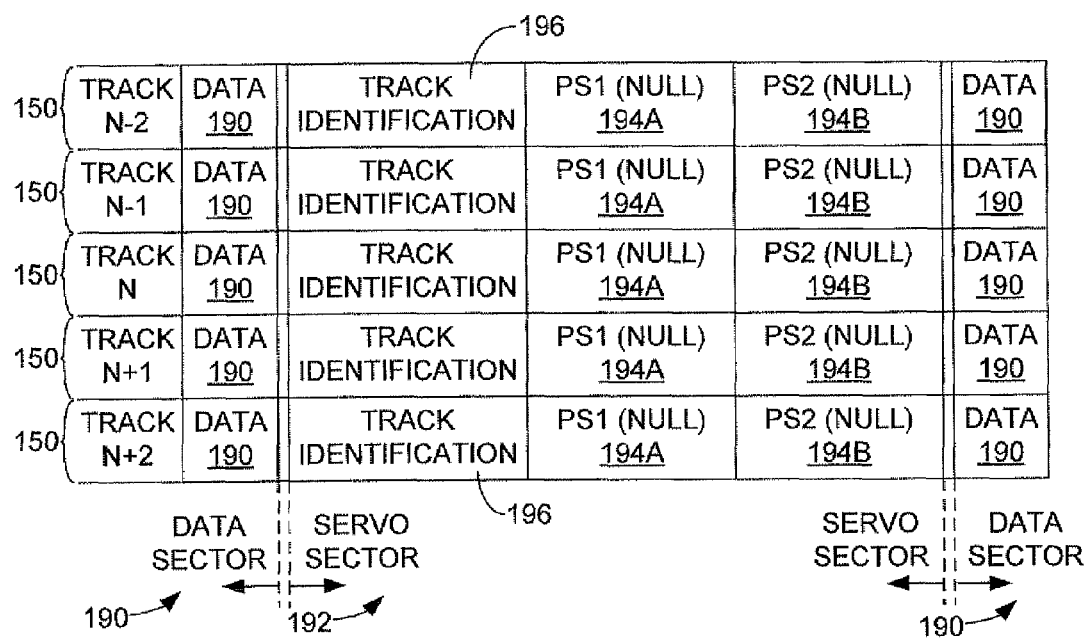
FIG. 6 is a simplified diagram illustrating portions of multiple tracks of a patterned recording media in accordance with embodiments of the invention.

FIG. 6 is a simplified diagram illustrating portions of multiple tracks 150 of the patterned recording media 140 in accordance with embodiments of the invention. Each track 150 contains data sectors 190 where the magnetic elements represent bits of data that can be read and written by a transducing head. Between the data sectors 190 of each track 150 lie servo sectors 192, which contain information used by the servo system 134 to control the position of the transducing head.

One embodiment of the servo sector 192 includes one or more null patterns 194, such as 194A (PS1) and 194B (PS2), for each track 150. Additionally, the servo sector 192 can include a gray-coded track identification 196 that identifies the particular track 150 of the media 140 that the head is positioned over. Embodiments of the servo sector 192 can include other information as well.

Figure 7:
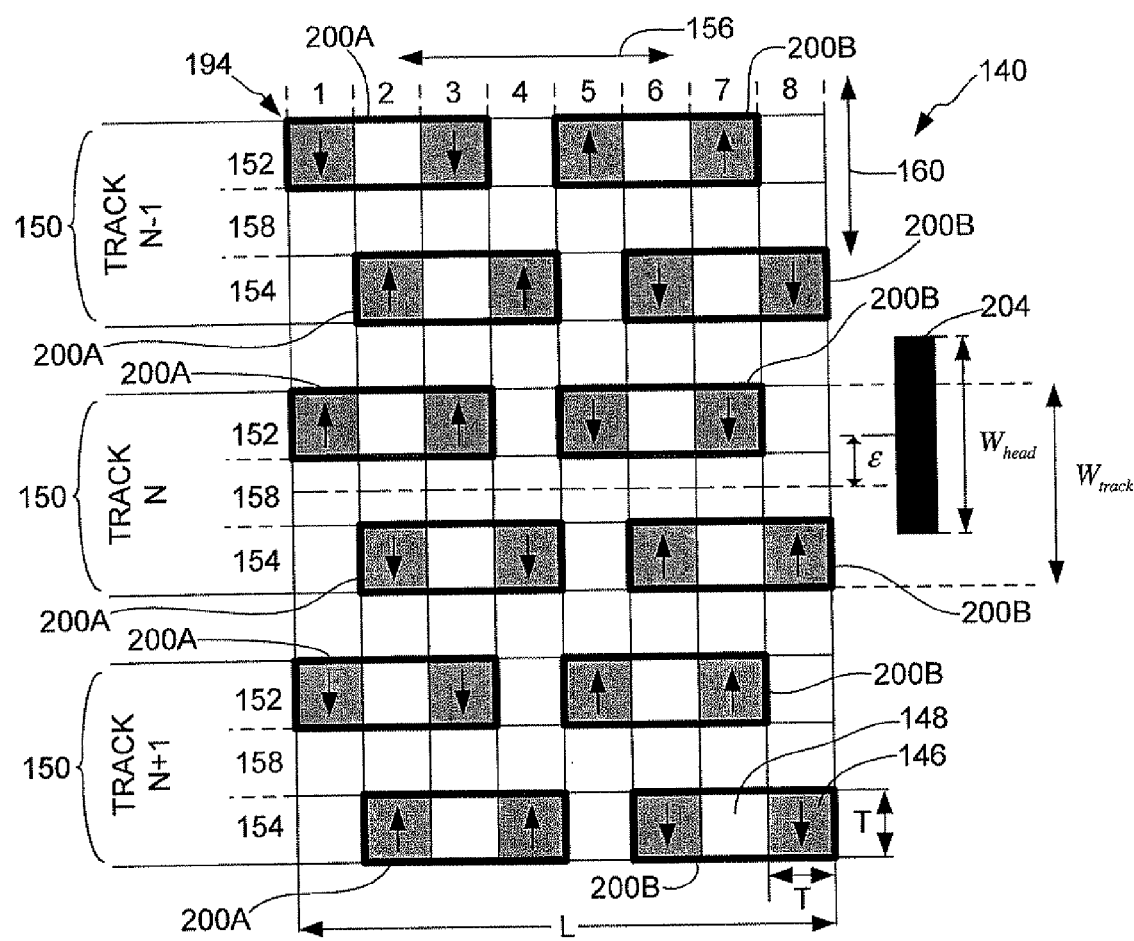
FIG. 7 is a simplified illustration of null patterns of a patterned recording media, in accordance with embodiments of the invention.

FIG. 7 is a simplified illustration of null patterns 194 of tracks 150 of the patterned recording media 140, in accordance with embodiments of the invention. The null pattern 194 formed in the servo sector 192 of each of the tracks 150 comprises the staggered rows 152 and 154 of the discrete magnetic elements 146. In one embodiment, the null pattern 194 comprises a plurality of consecutive groups, generally designated as 200, each comprising one or more of the discrete magnetic elements 146 in the staggered first and second rows 152 and 154. Each group 200 is represented by the thick lined boxes. Although only two groups 200 are shown in each of the rows 152 and 154, the null patterns 194 can comprise many more groups if desired. Embodiments of the groups 200 include the same number of elements 146 per group 200 and a variable number of elements per group 200.

In one embodiment, the magnetic polarity of the groups 200 in each row 152 or 154 are the same. That is, the discrete magnetic elements 146 of each of the groups 200 have the same magnetic polarity. In FIG. 7, and subsequent figures, the magnetic polarity of the magnetic elements 146 is indicated by the corresponding arrows pointing in either the upward direction or the downward direction relative to the page. For example, an arrow pointing in the upward direction can represent a positive polarity while an arrow pointing in the downward direction can represent a negative polarity. It should be understood that the arrows merely represent the polarity, which in reality could be oriented vertically or horizontally relative to the patterned recording layer 144 (FIG. 2).

In accordance with the embodiment illustrated in FIG. 7, the discrete magnetic elements 146 in the groups 200 in the first row 152 of each track 150 have alternating magnetic polarities. Thus, each group 200 in the first row 152 of the null pattern 194 of each track has a magnetic polarity that is opposite that of the adjoining groups 200 in the first row 152. Similarly, the discrete magnetic elements 146 in the groups 200 in the second row 154 of each track 150 have alternating polarities. Thus, each group 200 in the second row 154 of the null pattern 194 of each track has a magnetic polarity that is opposite that of the adjoining groups 200 in the second row 154. Alternatively, the magnetic polarities of the groups 200 can be the same in each row 152 and 154.

In one embodiment, the first group 200A in the first row 152 of each null pattern 194 has a magnetic polarity that is opposite the magnetic polarity of the first group 200A in the second row 154 of the null pattern 194.

In one embodiment, the magnetic polarity of the first group 200A in the first row 152 of one track is the same as the magnetic polarity of the first group 200A in the second row 154 of the adjoining track 150 that is separated from said first row 152 by a row of non-magnetic material 202. For example, the first group 200A in the first row 152 of track N has a positive polarity, which is the same as that of the first group 200A in the second row 154 of track N−1. Additionally, the first row in track N is separated from the second row in track N−1 by the row of non-magnetic material 202. In one embodiment, this pattern holds true for all of the null patterns of the tracks 150 of the patterned media 140.

As mentioned above, the transducing head (i.e., read head) 204 carried, for example, on the slider 116 (FIG. 1), travels over the recording media 140 and generates the readback signal 186 in response to the sensing of the magnetic fields of the discrete magnetic elements 146 that are in close proximity to the head (e.g., directly below the head). In FIG. 7, $\epsilon$ represents the position of the head 204 (e.g., center of the head) relative to the desired location (e.g., the center) within the track identified by the reference position signal 178 (FIG. 5), which here is the center of the track N.

Coarse head position adjustments can initially be made to place the head 204 within the desired track N using the gray-coded track identifications 196 (FIG. 6). Following such a coarse head position adjustment, the observable range of the head position $\epsilon$ is generally limited to that provided in Equation 1.

$$\epsilon \in [-0.5 W_{track}, 0.5 W_{track}] \qquad \text{Eq. 1}$$

For the given $\epsilon$ range in Eq. 1, the readback signal of the null pattern 194 in Track N is $$y(k) = \frac{\alpha_1(\varepsilon)}{T} y_1(k) + \frac{\alpha_2(\varepsilon)}{T} y_2(k) \qquad \text{Eq. 2}$$

where $y_1(k)$ and $y_2(k)$ represent the readback signal respectively generated by the first row 152 and the second row 154 of the desired track N at column k, and $\alpha_1(\varepsilon)$ and $\alpha_2(\varepsilon)$ are the portions of the width of the head ($W_{head}$) that overlap the first row 152 and the second row 154 of track N, respectively. As mentioned above, T represents the size of the magnetic elements 146.

Figure 8:
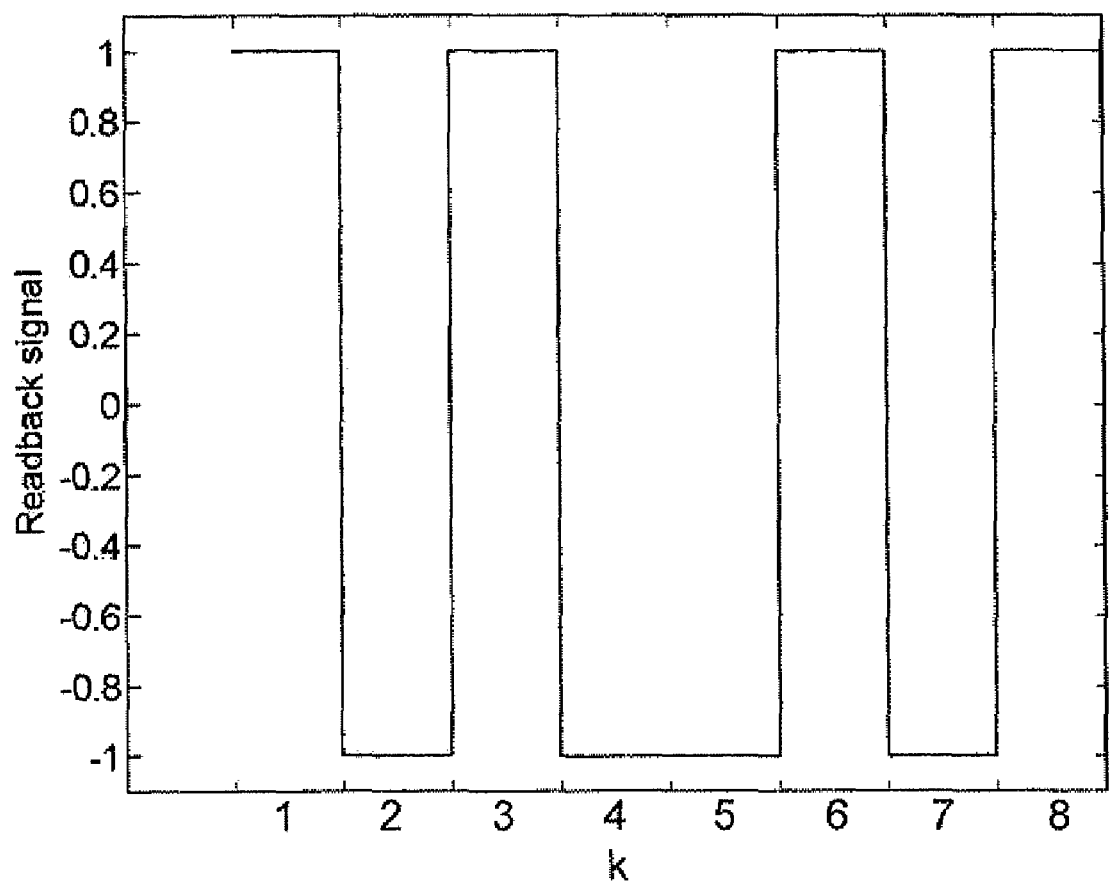
FIG. 8 is a chart depicting a time variant readback signal in accordance with embodiments of the invention.

Because of the staggered islands structure, $\{y_1(k)\}$ and $\{y_2(k)\}$ result in a time variant readback signal 186 due to their relationship. FIG. 8 is a chart depicting the time variant readback signal 186 that is generated by the head 204 as it passes over the null pattern 194 moving from column k=1 to column k=8 while the head 204 is centered within the track N. Thus, the readback signal 186 is non-zero even when the head is centered in the track (i.e., $\varepsilon$=0). This is significantly different from null servo patterns used in connection with the conventional, granular magnetic recording media. As a result, the null patterns in accordance with the present invention utilizing staggered discrete magnetic elements 146 require a different demodulation technique than that used with conventional (i.e., non-patterned) recording media.

Figure 9:
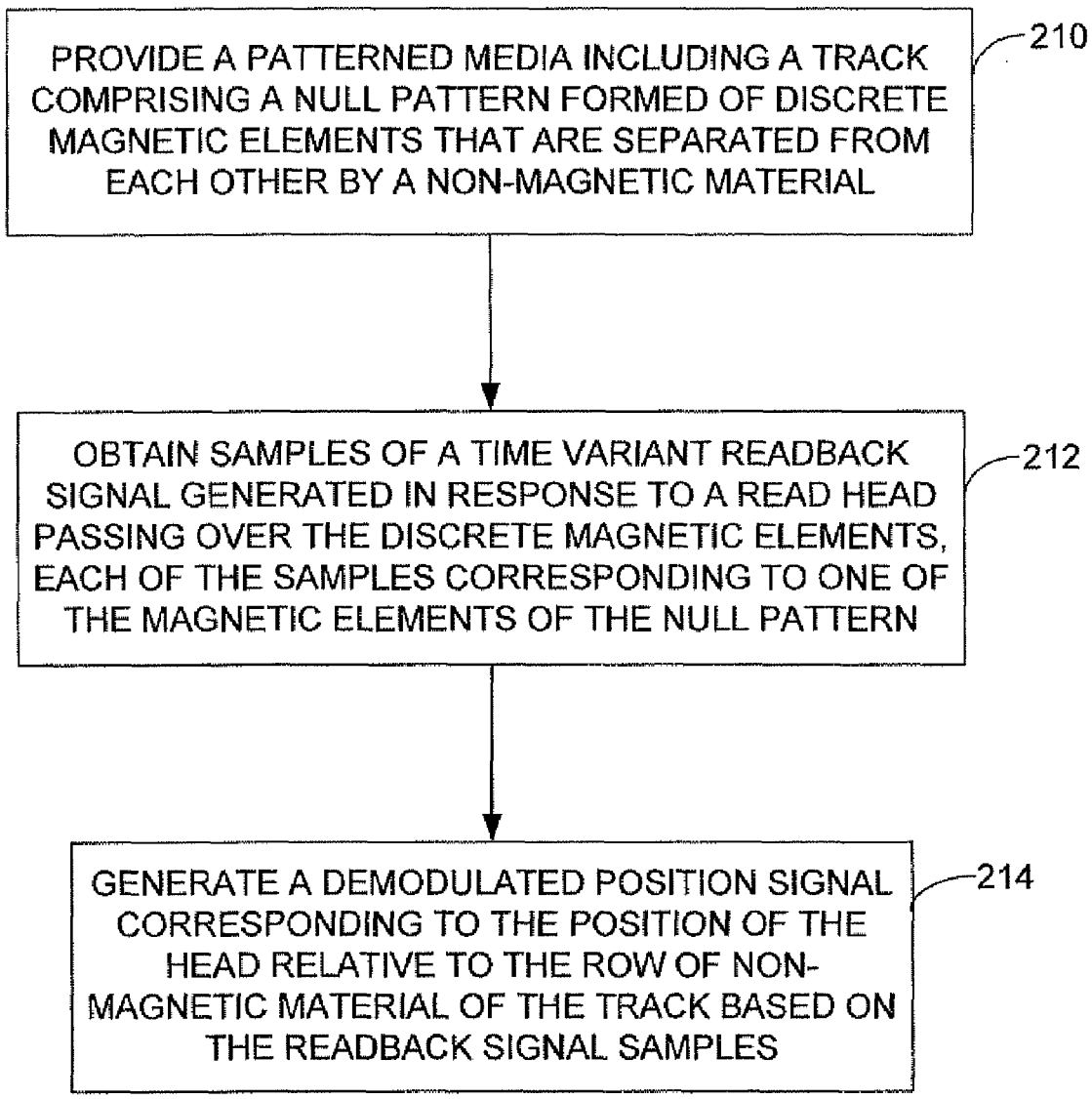
FIG. 9 is a flowchart illustrating a method of demodulating a readback signal in accordance with embodiments of the invention.

One embodiment of the invention is directed to a method of demodulating the readback signal 186 corresponding to the null pattern formed of the discrete magnetic elements 146, which is illustrated in the flowchart of FIG. 9. In one embodiment of the method, a patterned media, such as media 140 (FIG. 7), is provided at step 210 that includes a track (150) comprising a null pattern (194) formed of discrete magnetic elements (146) that are separated from each other by a non-magnetic material (148).

Figure 10:
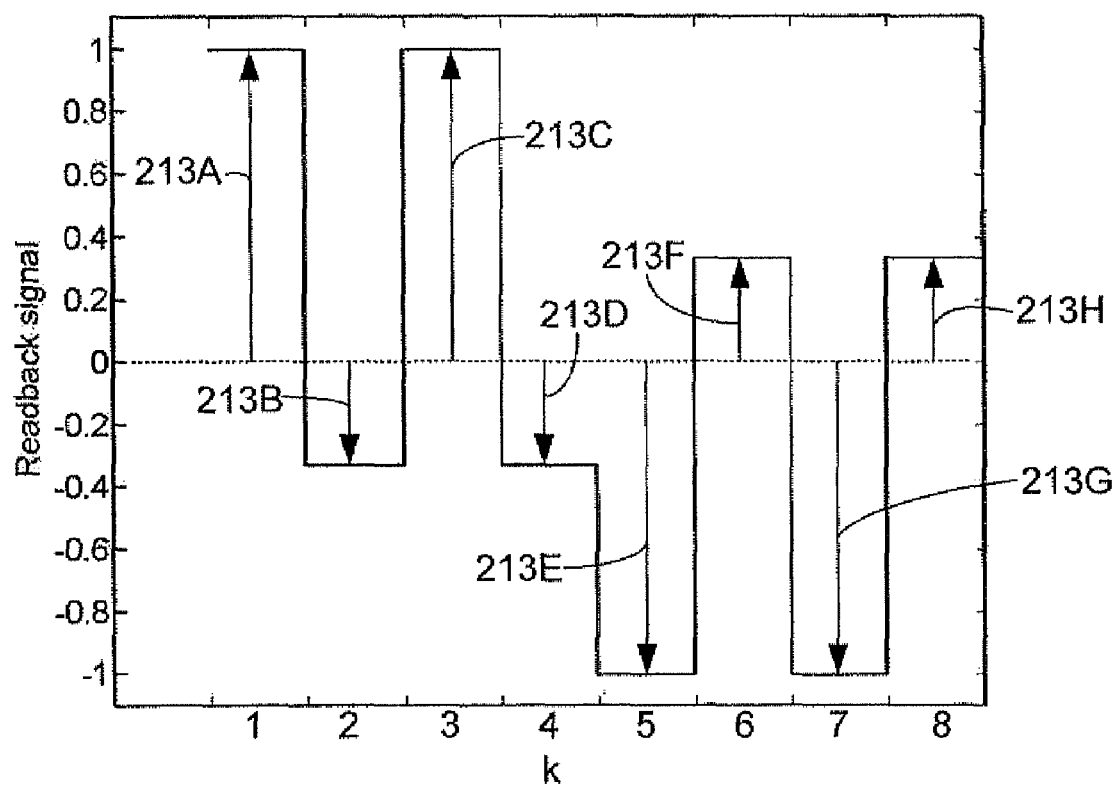
FIG. 10 is a chart depicting a time variant readback signal in accordance with an exemplary embodiment of the invention.

At step 212, samples of a time variant readback signal (186) are obtained in response to a read head (204) passing over the discrete magnetic elements of the null pattern. FIG. 10 illustrates the readback signal 186 of the read head 204 moving from column 1 to column 8 when it is displaced from the center of the track N by the distance $\varepsilon$, as shown in FIG. 7. Samples of the readback signal, generally referred to as 213, constitute a magnitude and sign of the readback signal 186 at each column of the track N corresponding to the discrete magnetic elements 146 of the null pattern 194. Accordingly, the readback signal samples 213A-H respectively correspond to the magnetic elements 146 of the null pattern 194 in the columns k=1 through k=8 for track N.

Finally, at step 214, a demodulated position signal (180) corresponding to the position of the head relative to the track is generated based on the readback signal samples 213. In one embodiment of step 214, the demodulated position signal is generated based on a summation of the readback signal samples 213.

In one embodiment of the method, the patterned recording media 140 includes embodiments of the null pattern 194 described above with respect to FIG. 7 and includes the plurality of consecutive groups 200 of one or more of the discrete magnetic elements 146 in the staggered first and second rows 152 and 154 of the track 150. The discrete magnetic elements 146 of each group 200 in the first row 152 have a magnetic polarity that is opposite that of the adjoining groups 200 in the first row 152. Likewise, the discrete magnetic elements 146 of each group 200 in the second row 154 have a magnetic polarity that is opposite that of the adjoining groups 200 in the second row 154.

Figure 11:
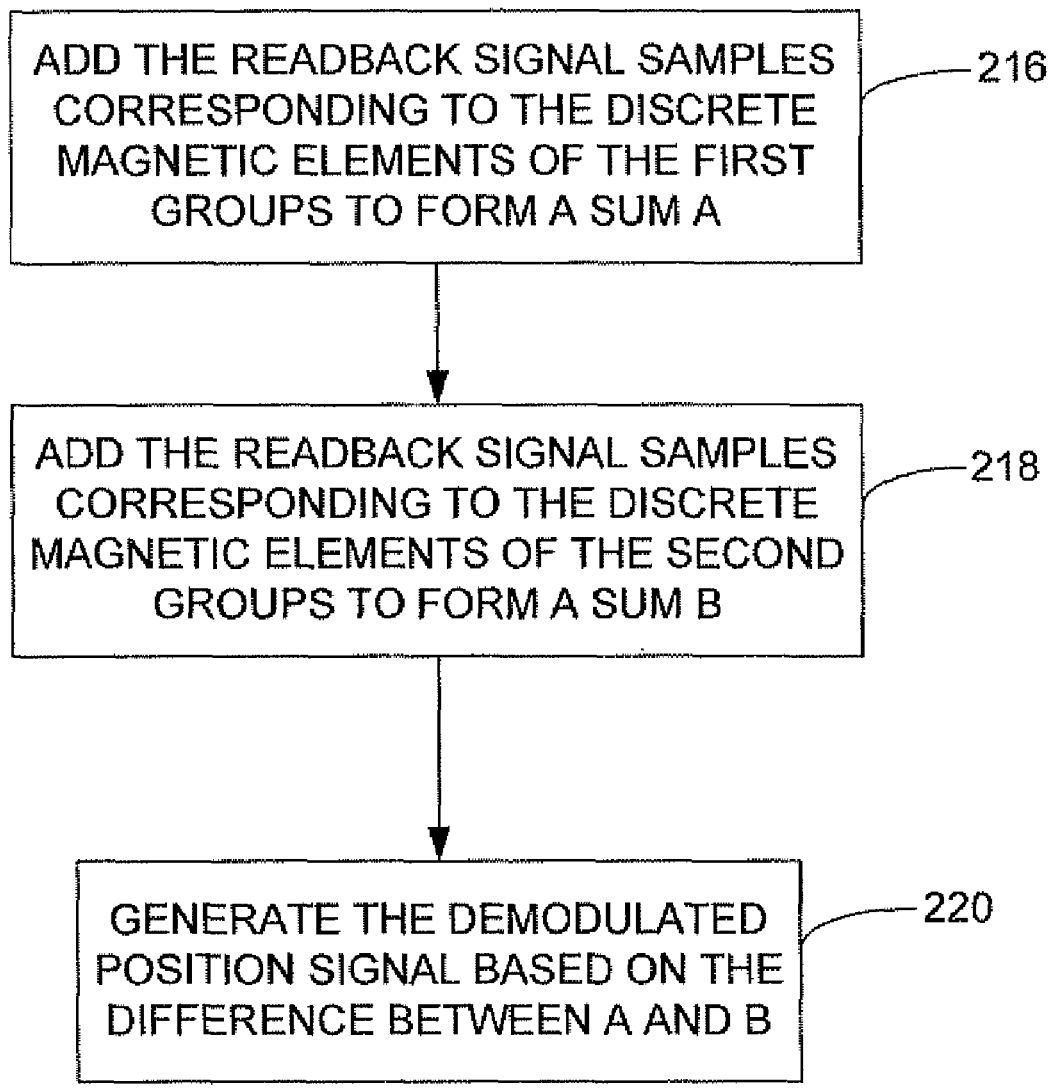
FIG. 11 is a flowchart illustrating one embodiment of the step 214 in accordance with embodiments of the invention.

Additionally, the consecutive groups 200 of the null pattern include alternating first and second groups 200A and 200B that adjoin each other in each of the rows 152 and 154. In one embodiment the magnetic polarity of the first group 200A in the first row 152 is opposite the magnetic polarity of the first group 200A in the second row 154 of the same track 150. FIG. 11 is a flowchart illustrating one embodiment of the step 214 in accordance with these embodiments of the null pattern 194.

At step 216, the readback signal samples 213 corresponding to the discrete magnetic elements 146 of the first groups 200A are added to form a sum A. Additionally, the readback signal samples 213 corresponding to the discrete magnetic elements 146 of the second groups 200B are added, at step 218, to form a sum B.

As mentioned above, the null pattern 194 may contain many more (or less) discrete magnetic elements 146 than depicted in FIG. 7. Additionally, the null pattern 194 can comprise more than the two groups 200 per row depicted in the exemplary null pattern 194 of FIG. 7. In general, the first groups 200A in a row 152 or 154 alternate with the second groups 200B in the same row. That is, for a given row 152 or 154 of the null pattern 194, a first group 200A is followed by a second group 200B, which is followed by a first group 200A, which is followed by a second group 200B, etc. depending on the number of groups 200 in the row. Accordingly, the sum A is the sum of the readback signal samples 213 corresponding to each of the discrete magnetic elements 146 in each of the first groups 200A of the null pattern and the sum B is the sum of the readback signal samples 213 corresponding to each of the discrete magnetic elements 146 in each of the second groups 200B of the null pattern of a given track 150.

For the exemplary null pattern 194 in FIG. 7, the readback signal samples 213A-D respectively correspond to the discrete magnetic elements 146 in columns 1, 2, 3 and 4 of the null pattern 194, and are added to form the sum A in step 216. The readback signal samples 213E-H corresponding to the discrete magnetic elements 146 of the second groups 200B are added, at step 218, to form the sum B. Accordingly, for the exemplary null pattern 194 in FIG. 7, the readback signal samples 213 corresponding to the discrete magnetic elements 146 in columns 1-4 of the pattern 194 for track N are added to form the sum A and the samples 213 corresponding to the discrete magnetic elements 146 in columns 5-8 of the null pattern 194 are added to form the sum B.

Finally, at step 220, the demodulated position signal is generated based on the difference between the sums A and B. In one embodiment, the demodulated position signal is generated based on the subtraction of the sum B from the sum A.

When the difference between the sums A and B is essentially zero, after possibly accounting for noise in the readback signal 186, the head 204 is positioned in the center of the track N and a read operation can commence within the data sectors 190 of track N. When the sum of A and B is not zero, the magnitude of the difference corresponds to the distance $\varepsilon$ the head 204 is from the center. The sign of the difference resulting from the subtraction of the sum B from the sum A indicates whether the head 204 is positioned closer to the first row 152 or the second row 154. For instance, with regard to the position of the head 204 shown in FIG. 7 with respect to the null pattern 194 of track N, the resultant sign from the subtraction of the sum B from the sum A will be a positive value, which for track N indicates that the head 204 is displaced from the center of track N toward the first row 152 of track N. The direction indication provided by the sign of the resultant subtraction of B from A can vary from track to track based on the null pattern 194.

Figure 12:
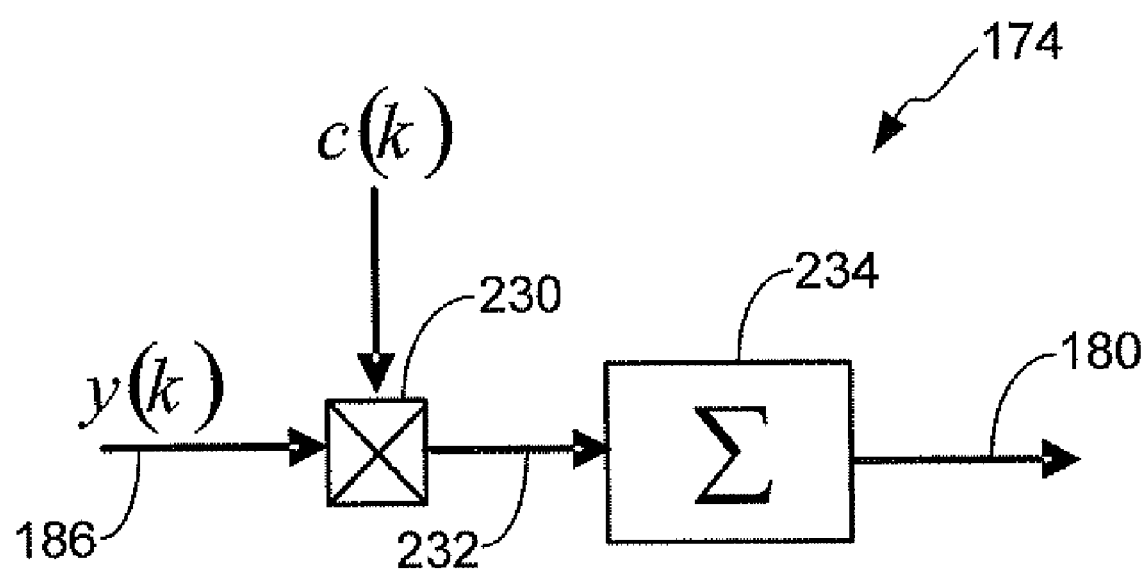
FIG. 12 is a simplified block diagram of a servo demodulator in accordance with embodiments of the invention.

FIG. 12 is a simplified block diagram of the servo demodulator 174 configured to implement embodiments of the method of demodulating the patterned media readback signal described above and generate the estimated position signal 180 as a linear function of $\epsilon$ for use by the servo system 134 to guide the positioning of the head 204. The demodulator 174 receives the readback signal 186 from the plant 172 (FIG. 5). The readback signal 186 can be represented as y(k) as discussed above with regard to Equation 2.

The parameter {c(k)} in FIG. 12, represents a demodulation reference signal, and can be chosen based on the trade-off between performance and computational complexity. In one embodiment {c(k)} is chosen as a matched filter having the relationship provided in Equation 3 to obtain the best performance (i.e., the smallest variance of the PS).

$$c(k) = y_1(k) - y_2(k) \qquad \text{Eq. 3}$$

When there is only 1 bit allowed for c(k), the computational complexity of servo demodulation can be reduced by defining c(k)=1, for k=8m+{1,2,3,4} and c(k)=−1, for k=8m+{5,6,7,8}. This selection for c(k) is shown in Equation 4 where m can be any integer. This selection for 1-bit demodulation reference signal c(k) can be understood as the 1-bit quantized version of the optimal performance demodulation reference signal.

$$c(k) = \begin{cases} 1, & k \in 8m + \{1, 2, 3, 4\} \\ -1, & k \in 8m + \{5, 6, 7, 8\} \end{cases} \qquad \text{Eq. 4}$$

The readback signal 186 that is generated by the head 204 as it passes over the null pattern 194 of the track N and the demodulation reference signal c(k) are supplied to a signal multiplier 230 of the demodulator 174. The signal multiplier 220 outputs a modified readback signal 232 corresponding to the multiplication of the signal 186 with c(k). The modified readback signal 232 is then provided to the summation block 234, which sums samples of the modified readback signal 232 corresponding to the related groups 200 of the null pattern 194.

For the null pattern depicted in FIG. 7, c(k) can be selected as provided in Equation 4 and the servo demodulator 174 samples the time instants of the readback signal corresponding to k∈8m+{1,2,3,4,5,6,7,8}. That is, the servo demodulator 174 samples the portions of the readback signal corresponding to the columns 1-8 to generate the readback signal samples 213. The resulting readback signal samples 213 each correspond to one of the discrete magnetic elements 146 of the null pattern 194. Additionally, the samples 213 that correspond to the second groups 200B (e.g., k∈8m+{5,6,7,8}) of the null pattern 194 are inverted prior to their summation with the other samples 213 due to the corresponding value of −1 for c(k).

The summation block 224 adds the samples 213 corresponding the first groups 200A of the elements 146 to form the sum A and adds the samples 213 corresponding to the second groups 200B to form the sum B. In one embodiment, the estimated position signal 180 (PS) is then generated in accordance with Equation 5.

$$PS = A - B \qquad \text{Eq. 5}$$

As illustrated in FIG. 6, the servo sectors 192 can include multiple null patterns, such as null pattern 194A and 194B. In accordance with one embodiment of the invention, the tracks 150 of the media 140 include at least two null patterns, one formed in accordance with the embodiments of the null pattern 194 (servo burst null pattern) described above and a quadrature servo burst null pattern 240, as illustrated in the simplified diagram of FIG. 13.

The quadrature servo burst null pattern 240 is used in combination with the above-described servo burst null pattern 194 in order to compensate for non-ideal factors, such as uncertainty of the reader head width and variation of magnetic response, for example, that may result in an estimated position signal 180 that is not perfectly linear with respect to $\epsilon$.

One embodiment of the null pattern 240 comprises, for each track 150, a plurality of consecutive groups, generally referred to as 242, of one or more of the discrete magnetic elements 146 in the first row 152 including a first group 242A adjoining the last group 200B in the first row 152 of the first null pattern 194. In accordance with one embodiment, the magnetic polarity of each group 242 in the first row 152 of the second null pattern 240 is opposite the magnetic polarity of adjoining groups in the first row 152 of the second null pattern 240.

Additionally, the pattern 240 comprises consecutive groups 242 of the discrete magnetic elements 146 in the second row 154 of the track 150 including a first group 242A adjoining the last group 200B in the second row 154 of the first null pattern 194. In accordance with one embodiment, the magnetic polarity of each group 242 in the second row 154 of the second null pattern 240 is opposite the magnetic polarity of the adjoining groups 242 in the second row 154 of the second null pattern 240. Alternatively, the magnetic polarities of the groups 242 can be the same in each row 152 and 154.

As discussed above with regard to the null pattern 194, the number of groups 242 having alternating magnetic polarities in the rows 152 and 154 of the null pattern 240 can vary as desired. Therefore, there can be more than the two groups per row shown in FIG. 13.

Figure 13:
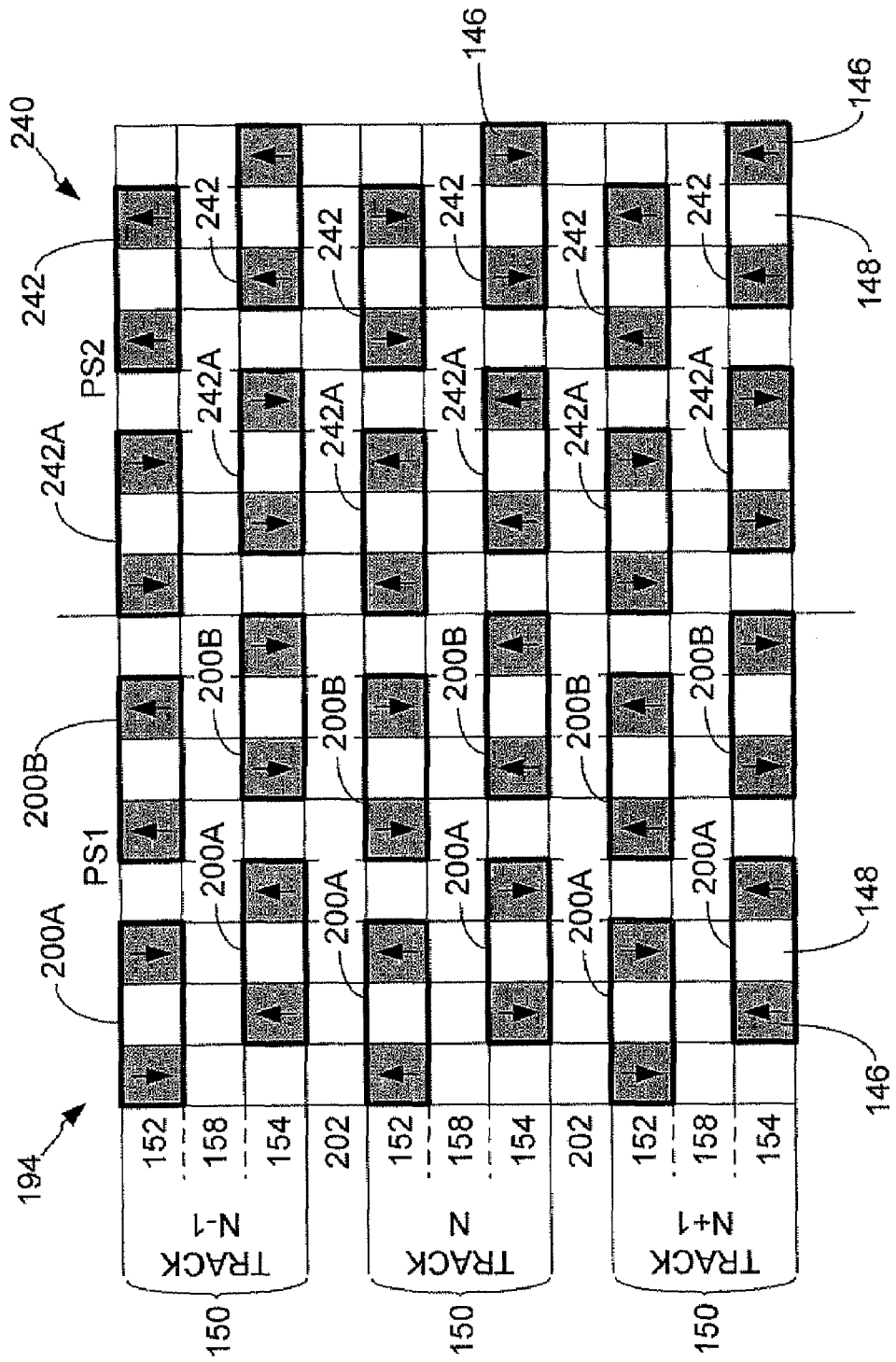
FIG. 13 is a simplified top plan view of null patterns in accordance with embodiments of the invention.

In one embodiment, the first groups 242A in the rows 152 and 154 of a given track 150 have the same magnetic polarity, as indicated by the arrows in FIG. 13.

In accordance with another embodiment, the magnetic polarity of the first group 242A in the first row 152 of the second null pattern 240 of a given track 150 is opposite the magnetic polarity of the last group 200B in the first row of the first null pattern of the track 150.

In accordance with another embodiment, the magnetic polarity of the first group 242A in the second row 154 of the second null pattern 240 of a given track 150 is the same as the magnetic polarity of the last group 200B in the second row 154 of the first null pattern 194 of the track 150.

Figure 14:
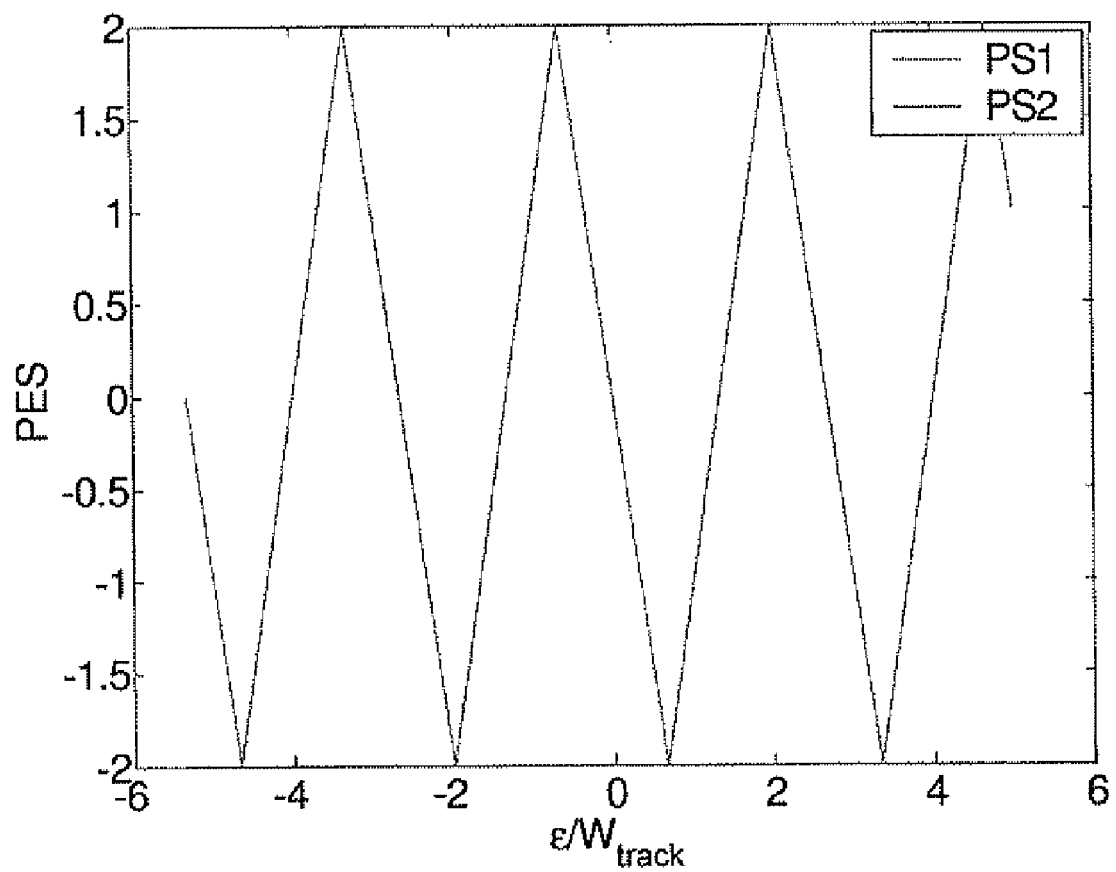
FIG. 14 illustrates an ideal relationship between a readback signal corresponding to the null patterns shown in FIG. 13 and a distance a read head is positioned relative to the center of a track.

The readback signals or position error signal (PES) 186 corresponding to the null pattern 194 (PS1) and the null pattern 240 (PS2) can be processed as discussed above with regard to the demodulator 174 to generate a position signal 186 for each. FIG. 14 illustrates the ideal relationship between the readback signals 186 corresponding to the null patterns 194 (PS1) and 240 (PS2) and $\epsilon$. There are many post-processing algorithms which can generate such a fully linear position signal (with respect to $\epsilon$) from the null patterns 194 and 240.

There are many advantages to forming the null patterns 194 and 240 in the servo sectors 192 using the staggered magnetic elements 146 of the media 140. One advantage is that it is not necessary to have different patterns of the discrete magnetic elements 146 for the data sectors 190 and the servo sectors 192. Thus, the discrete magnetic elements 146 of the servo sector 192 can be produced together with the discrete magnetic elements 146 of the data sectors 190. No extra production processing is needed for the null patterns, which results in a production cost savings.

Further, in conventional (i.e., non-patterned) magnetic recording media, such as granular media, the data and servo sectors are pre-defined during production. Because the discrete magnetic elements 146 of the null patterns 194 and/or 240 have the same structure as the discrete magnetic elements 146 of the data sectors 190, the number of the data elements used to form the data sectors 190 and the servo sectors 192 are adjustable. For instance, some of the data elements of the data sectors 190 can be allocated for use in the null patterns of the servo sectors 192. The resultant increase in the servo burst length L can improve the position estimation performance of the servo system 134. Conversely, the servo burst length L of the null pattern can be reduced by allocating some of the discrete magnetic elements of the null pattern to the data sectors 190 resulting in improved format efficiency.

Additionally, the frequency of the servo sectors 192 (i.e., number of data sectors 190 and servo sectors 192 per track) can also be easily adjusted. The head positioning performance of the servo system 134 can be greatly improved through choosing the optimal frequency of the servo sectors 192, which provides the optimal sample rate.

Figure 15:
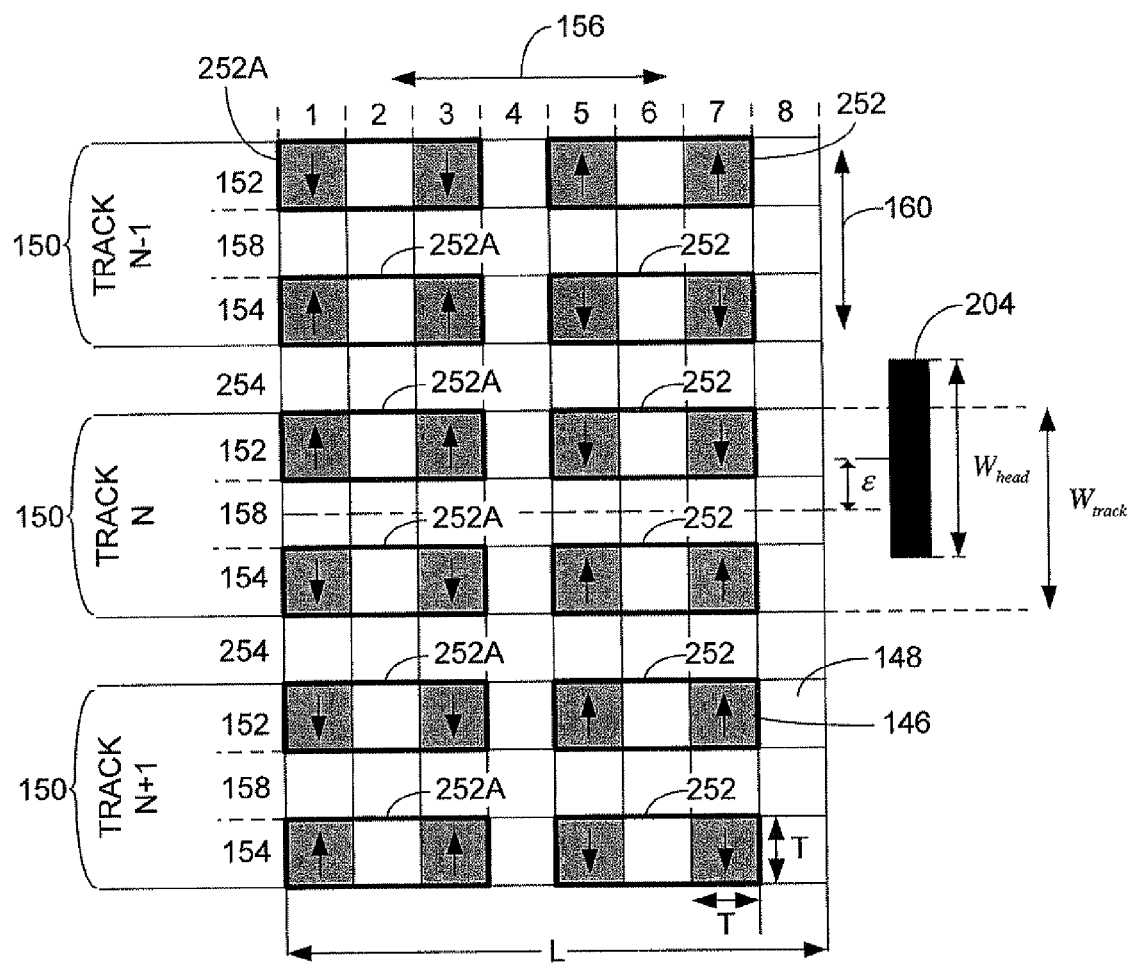
FIG. 15 is a simplified top plan view of null patterns of a patterned recording media in accordance with embodiments of the invention.

FIG. 15 is a simplified top plan view of null patterns 250 of the patterned recording media 140, in accordance with another embodiment of the invention. In this embodiment, the null patterns 250 each comprise rows 152 and 154 of the discrete magnetic elements 146 that are non-staggered or aligned. As used herein, the term "non-staggered" or "aligned" means that the discrete magnetic elements of the first row 152 are aligned with the magnetic elements of the second row 154 in the cross-track direction 160, which is transverse to the lengthwise direction 156.

Figure 16:
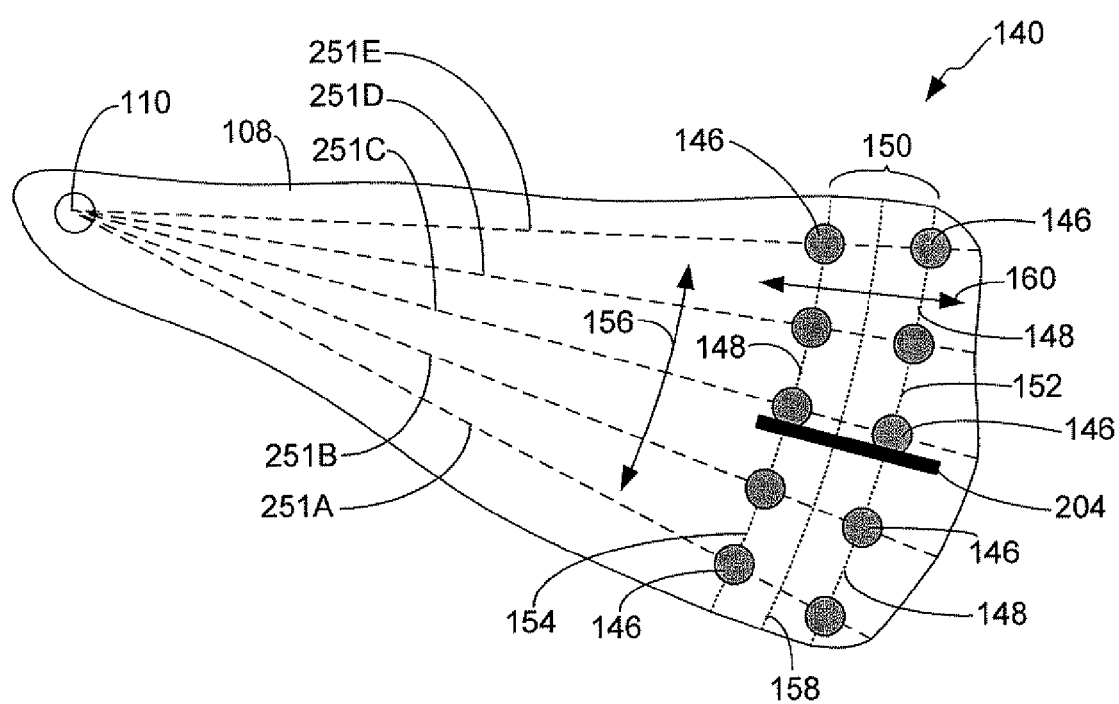
FIG. 16 is a partial top plan view of a patterned recording disc illustrating a single track in accordance with embodiments of the invention.

FIG. 16 is a partial top plan view of the patterned recording disc 108 illustrating an embodiment of the null pattern 250 of a single track 150, which could be used as a null pattern (i.e., PS1) of the servo data 192 shown in FIG. 5. In one embodiment of the disc 108, the first and second rows 152 and 154 of the track 150 are substantially concentric to the central axis 110 but have different radial positions relative to the central axis 110. In one embodiment, each of the discrete magnetic elements 146 in the first row 152 of the null pattern 250 has an angular position relative to the central axis that matches the angular position of one of the discrete magnetic elements 146 in the second row of the null pattern 250, as indicated by radial lines 251A-E. As a result, the first and second rows 152 and 154 are aligned.

One embodiment of the null pattern 250 formed in each of the tracks 150 comprises a plurality of consecutive groups, generally designated as 252, of one or more of the discrete magnetic elements 146 in the aligned first and second rows 152 and 154. Each group 252 is represented by the thick lined boxes. Although only two groups 252 are shown in each of the rows 152 and 154, the null patterns 250 can comprise many more groups if desired. Embodiments of the groups 252 include the same number of elements 146 per group 252 and a variable number of elements per group 252.

In one embodiment, the magnetic polarity of the groups 252 in each row 152 or 154 are the same. That is, the discrete magnetic elements 146 of each of the groups 252 have the same magnetic polarity.

In accordance with the embodiment illustrated in FIG. 16, the discrete magnetic elements 146 in the groups 252 in the first row 152 of each track 150 have alternating magnetic polarities. Thus, each group 252 in the first row 152 of the null pattern 250 of each track 150 has a magnetic polarity that is opposite that of the adjoining groups 252 in the first row 152. Similarly, the discrete magnetic elements 146 in the groups 252 in the second row 154 of each track 150 have alternating polarities. Thus, each group 252 in the second row 154 of the null pattern 250 of each track has a magnetic polarity that is opposite that of the adjoining groups 252 in the second row 154.

In one embodiment, the first group 252A in the first row 152 of each null pattern 250 in a given track 150 has a magnetic polarity that is opposite the magnetic polarity of the first group 252A in the second row 154 of the track. As a result, the components of the readback signal 186 generated by the read head 204 as it passes over the null pattern 250 corresponding to the first and second rows 152 and 154 are 180 degrees out-of-phase, as provided in Equation 6.

$$y_1(k) = -y_2(k) \qquad \text{Eq. 6}$$

The total readback signal of the pattern in FIG. 15 also satisfies Equation 2. When $\epsilon=0$, the readback signal is 0.

The non-staggered or aligned null servo pattern 250 can be used to generate an estimated position signal 180 that is a linear function of $\epsilon$. One advantage to the null pattern 250 is that the variance in the estimated position signal generated in response to the null pattern 250 is less than that produced in response to the null pattern 194 shown in FIG. 7, when the null patterns 194 and 250 have the same burst length L. As a result, the null pattern 250 of FIG. 15 will outperform the null pattern 194 of FIG. 7 in the sense of smaller variation in the generated position signal 186.

This performance advantage of the non-staggered null 250 pattern of FIG. 15 is achieved at the cost of a fixed burst length L as well as the servo and data sectors of the media 140, when the data sectors 190 comprise staggered discrete magnetic elements 146. The null pattern 194 utilizing the same pattern of the magnetic elements 146 as the data sectors of the media 140, allows for an adjustable burst length L and servo and data sectors of the media 140.

In one embodiment of the null pattern 250, the magnetic polarity of the first group 252A in the first row 152 of one track is the same as the magnetic polarity of the first group 252A in the second row 154 of the adjoining track 150 that is separated from said first row 152 by a row of non-magnetic material 254. For example, the first group 252A in the first row 152 of track N has a positive polarity, which is the same as that of the first group 252A in the second row 154 of track N−1. Additionally, the first row 152 in track N is separated from the second row in track N−1 by the row of non-magnetic material 254. In one embodiment, this pattern holds true for all of the null patterns of the tracks 150 of the patterned media 140.

Figure 17:
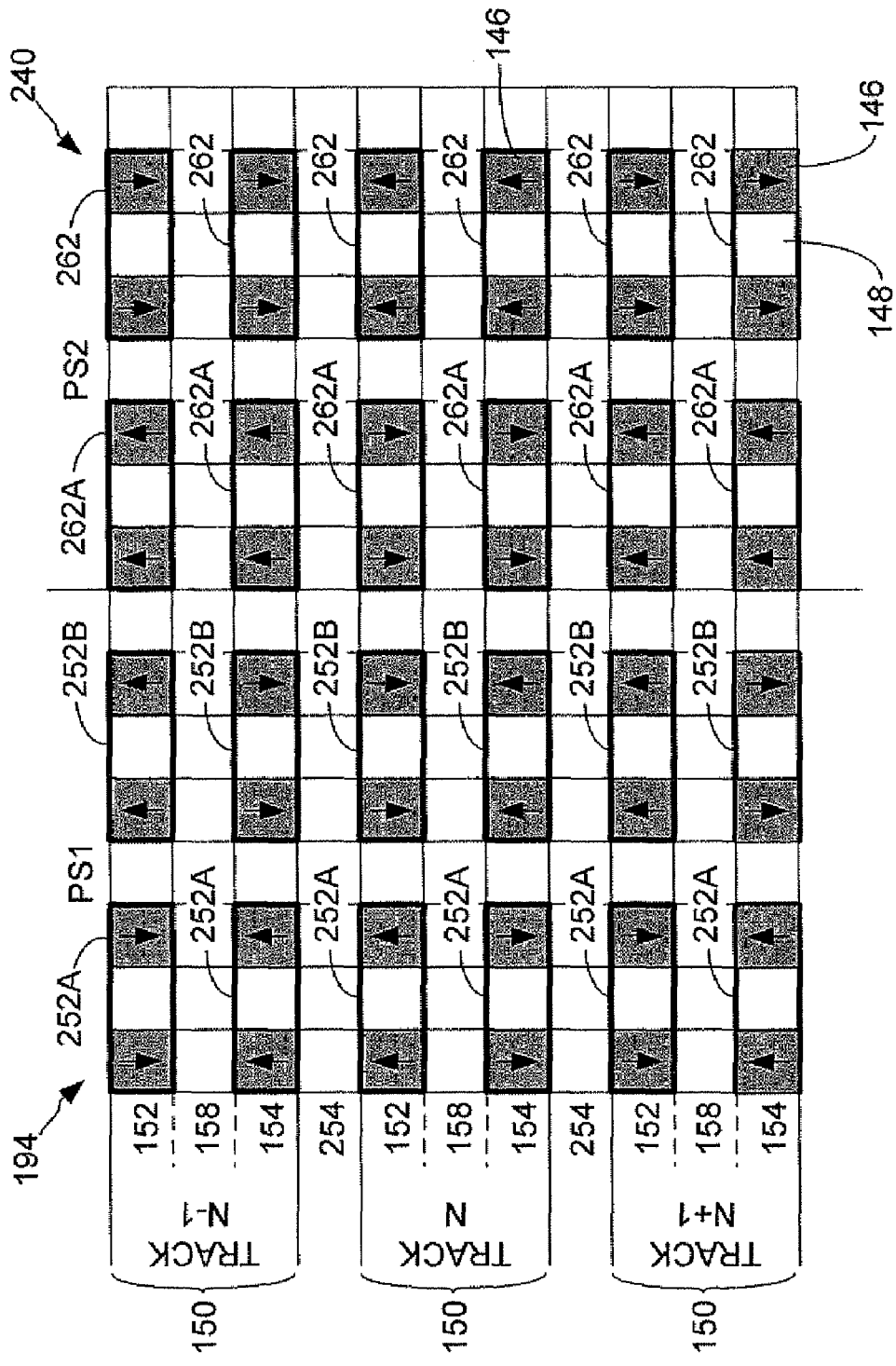
FIG. 17 is a simplified top plan view of null patterns in accordance with embodiments of the invention.

As with the null pattern 194, a quadrature servo burst null pattern 260 (PS2) can be used in combination added to the servo burst null pattern 250 (PS1), as illustrated in the simplified top plan view of a portion of the media provided in FIG. 17. The null pattern 260 can be used to compensate for non-ideal factors, such as uncertainty of the reader head width and variation of magnetic response, for example, that may result in an estimated position signal 180 that is not perfectly linear with respect to $\epsilon$ when the null pattern 250 is used alone.

One embodiment of the null pattern 260 comprises, for each track 150, a plurality of consecutive groups, generally referred to as 262, of one or more of the discrete magnetic elements 146 in the first row 152 including a first group 262A adjoining the last group 252B in the first row 152 of the first null pattern 250. In accordance with one embodiment, the magnetic polarity of each group 262 in the first row 152 of the second null pattern 260 is opposite the magnetic polarity of adjoining groups in the first row 152 of the second null pattern 260.

Additionally, the pattern 260 comprises consecutive groups 262 of the discrete magnetic elements 146 in the second row 154 of the track 150 including a first group 262A adjoining the last group 252B in the second row 154 of the first null pattern 250. In accordance with one embodiment, the magnetic polarity of each group 262 in the second row 154 of the second null pattern 260 is opposite the magnetic polarity of the adjoining groups 262 in the second row 154 of the second null pattern 260.

As discussed above with regard to the null pattern 250, the number of groups 262 having alternating magnetic polarities in the rows 152 and 154 of the null pattern 260 can vary as desired. Therefore, there can be more than the two groups per row shown in FIG. 17.

In one embodiment, the first groups 262A in the rows 152 and 154 of a given track 150 have the same magnetic polarity, as indicated by the arrows in FIG. 17.

In accordance with another embodiment, the magnetic polarity of the first group 262A in the first row 152 of a track 150 is the same as the magnetic polarity of the last group 252B in the first row of the first null pattern, as shown in FIG. 17.

In accordance with another embodiment the magnetic polarity of the first group 262A in the second row 154 of the null pattern 260 of one of the tracks 150 is opposite the magnetic polarity of the last group 252B in the second row 154 of the first null pattern 250 of the same track 150.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. Patterned recording media comprising:
a first segment comprising first and second rows of discrete magnetic elements separated by a non-magnetic material; and
a first null pattern comprising consecutive groups of discrete magnetic elements in the first segment;
a second segment comprising first and second rows of discrete magnetic elements separated from each other by a non-magnetic material, the first row of the second segment separated from the second row of the first segment by the non-magnetic material; and
a first null pattern comprising consecutive groups of discrete magnetic elements in the second segment;
wherein a magnetic polarity of a first group of the first null pattern in the first row of the second segment is the same as the magnetic polarity of a first group of the first null pattern in the second row of the first segment.

2. The media of claim 1, further comprising:
the first null pattern formed in the first segment comprising:
consecutive groups of the discrete magnetic elements in the first row of the first segment, each group in the first row having a magnetic polarity that is opposite the magnetic polarity of adjoining groups in the first row of the first segment; and
consecutive groups of the discrete magnetic elements in the second row of the first segment, each group in the second row having a magnetic polarity that is opposite the magnetic polarity of adjoining groups in the second row of the first segment; and
the first null pattern formed in the second segment comprising:
consecutive groups of the discrete magnetic elements in the first row of the second segment, each group in the first row of the second segment having a magnetic polarity that is opposite the magnetic polarity of adjoining groups in the first row of the second segment; and
consecutive groups of the discrete magnetic elements in the second row of the second segment, each group in the second row of the second segment having a magnetic polarity that is opposite the magnetic polarity of adjoining groups in the second row of the second segment.

3. The media of claim 1, wherein the first and second rows of the first segment extend circumferentially, the first row is positioned at a different radial location from a central axis than the second row.

4. The media of claim 1, wherein:
the discrete magnetic elements of the first and second rows of the first null pattern formed in the first segment are staggered; and
the consecutive groups in the first and second rows of the first null pattern formed in the first segment each include a first group from a specific radial location, wherein the magnetic polarity of the first group of the first row is opposite the magnetic polarity of the first group of the second row.

5. The media of claim 4, further comprising a second null pattern adjoining the first null pattern, the second null pattern comprising:
consecutive groups of the discrete magnetic elements in the first row including a first group adjoining a last group in the first row of the first null pattern, a magnetic polarity of each group in the first row of the second null pattern is opposite the magnetic polarity of adjoining groups in the first row of the second null pattern; and
consecutive groups of the discrete magnetic elements in the second row including a first group adjoining a last group in the second row of the first null pattern, a magnetic polarity of each group in the second row of the second null pattern is opposite the magnetic polarity of adjoining groups in the second row of the second null pattern.

6. The media of claim 5, wherein the first groups of the second null pattern have the same magnetic polarity.

7. The media of claim 6, wherein the magnetic polarity of the first group in the first row of the second null pattern is opposite the magnetic polarity of the last group in the first row of the first null pattern.

8. The media of claim 6, wherein the magnetic polarity of the first group in the second row of the second null pattern is the same as the magnetic polarity of the last group in the second row of the first null pattern.

9. The media of claim 1, wherein:
the magnetic elements of the first and second rows of the first null pattern are aligned with each other in a radial direction that is transverse to a lengthwise direction of the first segment in which the first and second rows extend; and
the consecutive groups of the first and second rows each include first and last groups, wherein the magnetic polarity of the first group of the first row is opposite the magnetic polarity of the first group of the second row.

10. The media of claim 9, wherein the media further comprises a second null pattern adjoining the first null pattern, the second null pattern comprising:
consecutive groups of the discrete magnetic elements in the first row including a first group adjoining the last group in the first row of the first null pattern, a magnetic polarity of each group in the first row of the second null pattern is opposite the magnetic polarity of adjoining groups in the first row of the second null pattern; and
consecutive groups of the discrete magnetic elements in the second row including a first group adjoining the last group in the second row of the first null pattern, a magnetic polarity of each group in the second row of the second null pattern is opposite the magnetic polarity of the adjoining group in the second row of the second null pattern.

11. The media of claim 10, wherein the first groups of the second null pattern have the same magnetic polarity.

12. The media of claim 11, wherein the magnetic polarity of the first group in the first row of the second null pattern is the same as the magnetic polarity of the last group in the first row of the first null pattern.

13. The media of claim 12, wherein the magnetic polarity of the first group in the second row of the second null pattern is opposite the magnetic polarity of the last group in the second row of the first null pattern.

14. Patterned recording media comprising:
a plurality of patterned discrete magnetic elements separated from each other by non-magnetic material; and
a plurality of concentric recording segments each positioned at a different radial location from a central axis, each segment comprising first and second concentric rows of the discrete magnetic elements forming data sectors and a null pattern, the null pattern comprising:
consecutive groups of the discrete magnetic elements in the first row of the segment, the magnetic elements of each group in the first row having a magnetic polarity that is opposite the magnetic polarity of adjoining groups in the first row; and
consecutive groups of the discrete magnetic elements in the second row of the segment, the magnetic elements of each group in the second row having a magnetic polarity that is opposite the magnetic polarity of adjoining groups in the second row;
wherein a plurality of the discrete magnetic elements in the first row of the null pattern of one of the segments each have an angular position, relative to the central axis, that is the same as one of the discrete magnetic elements in the second row of the null pattern.

15. The media of claim 14, wherein the magnetic polarity of a first group in the first row is opposite the magnetic polarity a first group in the second row.

16. The media of claim 14, wherein the magnetic elements of the first and second rows of the null pattern are staggered.

17. Patterned recording media comprising:
a first segment comprising first and second rows of discrete magnetic elements separated by a non-magnetic material;
a first null pattern formed in the first segment comprising:
consecutive groups of discrete magnetic elements in the first row of the first segment;
consecutive groups of the discrete magnetic elements in the second row of the first segment;
a second null pattern adjoining the first null pattern, the second null pattern comprising:
consecutive groups of discrete magnetic elements in the first row including a first group adjoining a last group in the first row of the first null pattern; and
consecutive groups of the discrete magnetic elements in the second row including a first group adjoining a last group in the second row of the first null pattern;
wherein the first group of the first row of the second null pattern and the first group of the second row of the second null pattern have the same magnetic polarity.

18. The media of claim 17, wherein the magnetic polarity of the first group in the first row of the second null pattern is opposite the magnetic polarity of the last group in the first row of the first null pattern.

19. The media of claim 18, wherein the magnetic polarity of the first group in the second row of the second null pattern is the same as the magnetic polarity of the last group in the second row of the first null pattern.

* * * * *